(No Model.)  2 Sheets—Sheet 1.

J. REECE.
CLUTCH MECHANISM.

No. 367,063.  Patented July 26, 1887.

Witnesses.

Inventor.
John Reece.

(No Model.) 2 Sheets—Sheet 2.

J. REECE.
CLUTCH MECHANISM.

No. 367,063. Patented July 26, 1887.

Witnesses.
Arthur Zipperlen.
John F. C. Prindlerk.

Inventor:
John Reece,
by Crosby & Gregory attys.

UNITED STATES PATENT OFFICE.

JOHN REECE, OF BOSTON, MASSACHUSETTS.

CLUTCH MECHANISM.

SPECIFICATION forming part of Letters Patent No. 367,063, dated July 26, 1887.

Application filed September 21, 1886. Serial No. 214,158. (No model.)

*To all whom it may concern:*

Be it known that I, JOHN REECE, of Boston, county of Suffolk, and State of Massachusetts, have invented an Improvement in Clutch Mechanisms, of which the following description, in connection with the accompanying drawings, is a specification, like letters on the drawings representing like parts.

This invention has for its object to improve that class of stop mechanism wherein a shaft is to be rotated intermittingly by a continuously-rotating pulley, the said shaft and pulley as herein devised having co-operating with them an intermediate clutch mechanism, whereby the pulley may be made to turn loose on the shaft or be made to drive the said shaft, the said intermediate devices being actuated by means of a controlling-bar having suitable inclines which measure the periods of motion and of rest of the said shaft.

My invention is herein supposed to be embodied in connection with a sewing-machine for stitching button-holes—such, for instance, as shown in United States Patent No. 240,546; but it may be embodied in any other class of machinery—as, for example, in looms or spinning-mules—wherein a shaft is to be rotated any predetermined number of times and then be left at rest.

My invention consists, essentially, of a head or frame, a main shaft supported thereby, a loose belt-pulley on the said shaft having a cam-ring secured thereto, a disk or hub fixed on said shaft, and a clutch-lever pivoted on said disk or hub and adapted to engage said cam-ring to impart rotation to the main shaft, combined with a rock-shaft carried by said head or frame and having arms, one of said arms being effective to permit the clutch-lever to be brought into engagement with the cam-ring to rotate the main shaft, the other of said arms being effective to withdraw the clutch-lever from engagement with the cam-ring to stop rotation of the main shaft. One of the arms of the said rock-shaft is actuated by a controller-bar having inclined or cam surfaces, the said rock-shaft and the said controller-bar being moved relatively to each other to enable a toe or projection of the said arm to travel along over the surface of the controller-bar.

Figure 1:
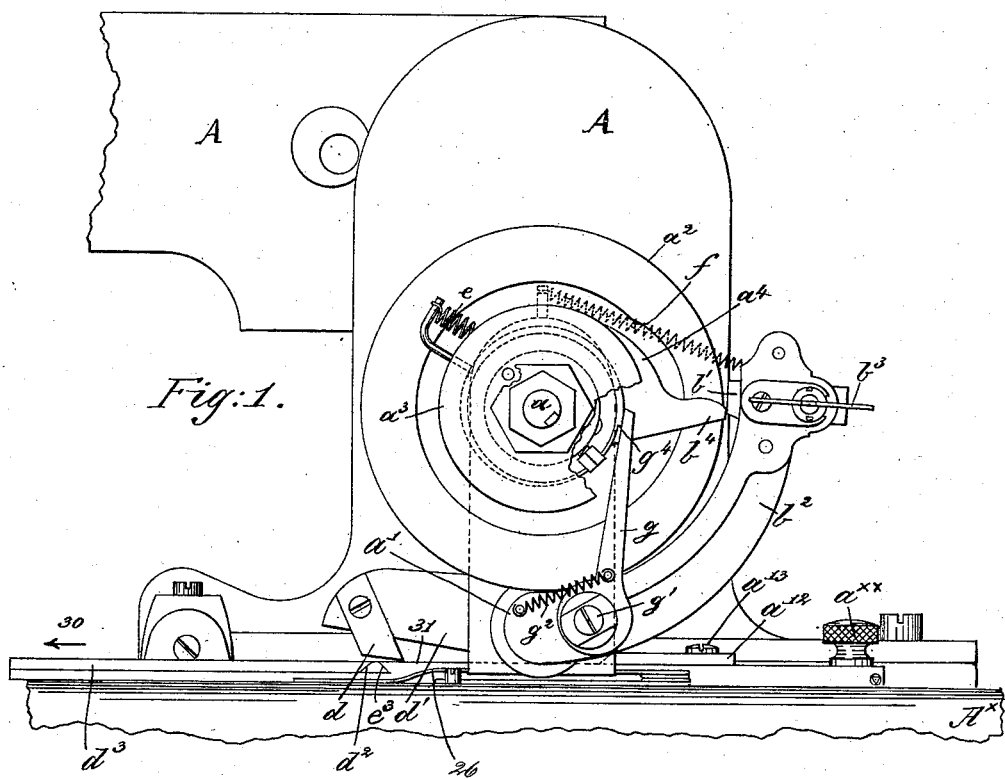
Figure 2:
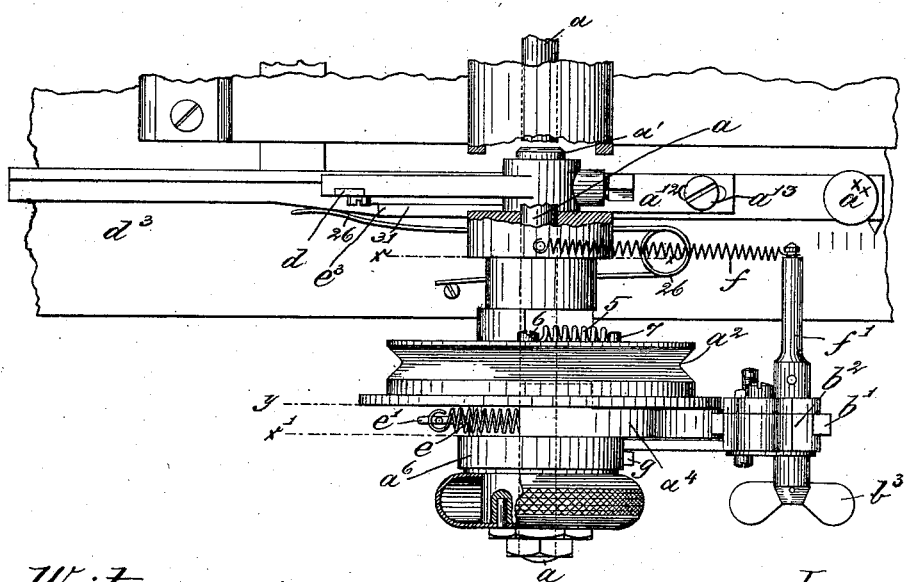
Figure 3:
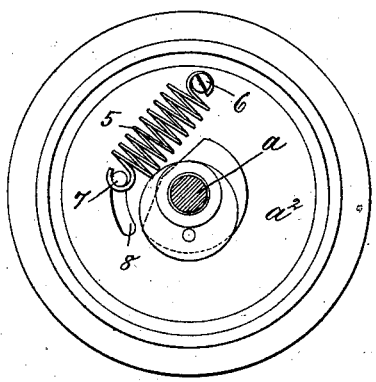
Figure 4:
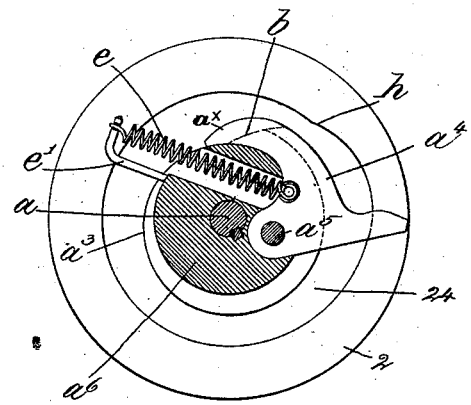
Figure 5:
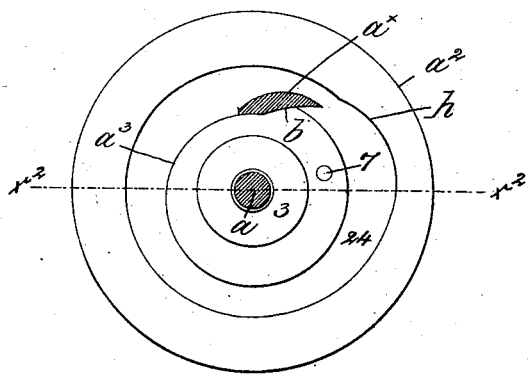
Figure 6:
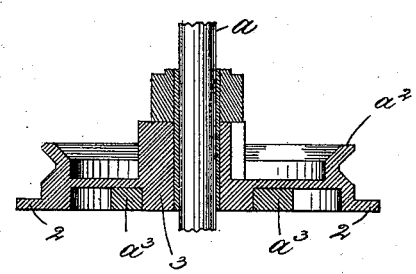
Figure 7:
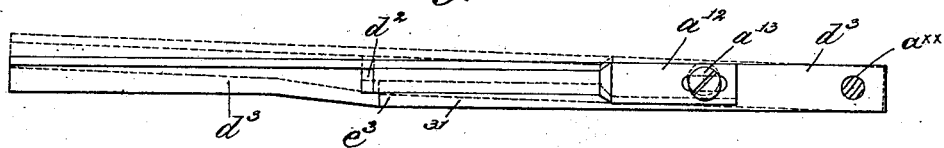

Figure 1 in side elevation shows a sufficient portion of a Reece button-hole sewing-machine to enable my invention to be understood; Fig. 2, a top or plan view thereof; Fig. 3, a section on line $x$ of Fig. 2, looking toward the bottom of the sheet; Fig. 4, a section on line $x'$, Fig. 2, looking toward the top of the sheet; Fig. 5, a section on line $y$, Fig. 2, looking in same direction; Fig. 6, a transverse section through the loose belt-pulley in the line $x^2$, Fig. 5; and Fig. 7, a plan view of the controller-bar alone, the dotted lines showing it swung aside, as when the toe to be described is riding upon the dog carried by the controller-bar.

The frame A, herein shown as an overhanging frame and made movable relatively to the base $A^\times$, has suitable bearings to receive a main shaft, $a$, and below it a rock-shaft, $a'$, (see Fig. 2,) substantially as shown in my United States Patent No. 240,546 above referred to.

The main shaft $a$ has loosely mounted upon it a belt-pulley, $a^2$, herein shown as provided with a projecting flange, 2, (see Fig. 6,) within which is a cam-shaped groove, a cam-ring, $a^3$, being loosely mounted on the hub 3 of the said pulley, the said cam-ring being maintained in forward position upon the said hub by a spring, 5, (see Fig. 3,) fastened at one end to a stud, 6, projecting from the opposite face of the pulley $a^2$, the other end of the said spring being secured to a stud, 7, projecting from the cam-ring through a slot, 8, in said pulley.

The cam-groove referred to is entered by a projection, $a^\times$, on a clutch-lever, $a^4$, pivoted, as at $a^5$, (see Fig. 4,) to a disk or hub, $a^6$, splined upon and secured to the main shaft $a$. (See Fig. 4.)

The cam-ring $a^3$ has its periphery somewhat sharply inclined, as at $b$, (see Figs. 4 and 5,) to be engaged, as shown in Fig. 5, by the projection $a^\times$, as will be described, to rotate the main shaft $a$ and operate the parts connected thereto.

When it is desired that the main shaft $a$ should remain at rest, the clutch-lever $a^4$ is normally kept disengaged from the incline $b$ of the cam-ring $a^3$ by a movable stud, $b'$, mounted in the arm $b^2$, secured to the rock-shaft $a'$, the said stud being made movable by a key, $b^3$, to place it in the path of revolution of the arm $b^4$ of the clutch-lever $a^4$, an eccentric at the inner end of the said key entering a hole in the said stud.

The stud $b'$ is automatically withdrawn from its engagement with the arm $b^4$ whenever a toe, $d$, secured to an arm, $d'$, of the said rock-shaft $a'$, rides up the inclined end $d^2$ of the movable block $a^{12}$, let into the controlling-bar $d^3$, pivotally secured to the bed $A^\times$ at $a^{\times\times}$, and operated substantially as in the patent above referred to, the said movable block being adjustably connected to the said controlling-bar by a screw, $a^{13}$, the adjustment of the said block enabling the stud $b'$ to be withdrawn from the arm $b^4$ at a predetermined position of the operative parts. As the toe-piece $d$ rides up the incline $d^2$, it being supposed that the frame-work A is moved longitudinally, as provided for in the said patent, the arm $d'$ is raised, thus partially turning or rocking the shaft $a'$ and lowering the arm $b^2$ and stud $b'$, carried thereby, away from and out of engagement with the arm $b^4$ of the clutch-lever. The stud $b'$, being thus withdrawn from its engagement with the arm $b^4$, permits a spring, $e$, fastened at one end to the lever $a^4$ and at its other end to an arm, $e'$, secured to the hub $a^6$, to act upon the clutch-lever and bring projection $a^\times$ on the said lever into engagement with the incline $b$ of the cam-ring $a^3$, which enables the pulley $a^2$ to impart rotation to the main shaft $a$ in unison with it, the rotation of the said main shaft operating all the parts connected thereto—as, for instance, in the patent referred to, the stitching mechanism.

As the toe-piece $d$ travels along the controller-bar $d^3$ in the direction of the arrow 30, Fig. 1, as when the second side of the button-hole is being finished, the said toe-piece $d$ rests upon the part 31 of the controller-bar, it being swung aside about the pivot $a^{\times\times}$, and as the last side or half of the button-hole is finished the said bar drops from the shoulder $e^3$ at the end of the part 31, permitting a spring, $f$, connected to a stud of the frame A, and a rod, $f'$, of the arm $b^2$, to rock or turn the rock-shaft $a'$ into its normal position and place the stud $b'$ again in the path of revolution of the arm $b^4$ of the clutch-lever $a^4$ to turn said clutch-lever on its pivot and lift it out of engagement with the incline $b$ of the cam-ring, to thereby stop the rotation of the main shaft $a$ and the operation of the machine. Immediately after the toe $d$ drops, as stated, the controller-bar is moved outward against the spring 26 by devices such as described in my said patent, the said devices consisting of a pin having a notched head to engage the said controller-bar, the said pin being moved endwise by a vertical rod which travels with the frame and which has at intervals a horizontal movement relative to the said frame when the machine is in operation, the said controller-bar being normally held in position to keep the block $a^{12}$ in line with the toe $d$.

In order that the main shaft and the parts of the machine operated thereby may not be instantaneously stopped, which might occasion damage by breaking of parts, the outer wall of the groove 24 of the belt-pulley is made of cam shape, as shown at $h$, (see Figs. 4 and 5,) the cam part being of such pitch that the clutch-lever is gradually withdrawn from contact with the cam-ring $a^3$, the contact of the projection $a^\times$ with the said outer wall at the said cam part $h$ limiting the movement of the said projection outward from the said cam-ring, thus providing for a gradual stopping of the machine.

To prevent the recoil or backward rotation of the main shaft $a$ when the clutch-lever is released from engagement with the cam-ring, I have provided a pawl, $g$, pivoted at $g'$ to the arm $b^2$, the said pawl being kept in engagement with the face of the disk or hub $a^6$ by a spring, $g^2$, (see Fig. 1,) the said pawl engaging a shoulder, $g^4$, on the said disk or hub.

In the foregoing description of my invention the parts have been supposed to be parts of a sewing-machine for stitching button-holes; but it is obvious that the frame A might be made stationary, and that the controller-bar might be moved longitudinally under the toe $d$, and that instead of a straight bar I might employ a rotating disk, the periphery of which was made cam-shaped to strike the toe $d$ and operate the rock-shaft $a'$ at the proper time.

I claim—

1. In a clutch mechanism, the shaft $a$, the loose pulley thereon provided at one side with a cam-ring, a hub fast to the said shaft, and a clutch-lever pivoted to the said hub and provided with a projection adapted to engage a portion of the said cam-ring, combined with a controller device having a cam-surface, and a rock-shaft having arms, one of which is provided with a stud to engage the clutch-lever, the other arm being actuated by the said controller device to effect the release of the clutch at the proper time, substantially as described.

2. In a clutch mechanism, the shaft $a$, the loose pulley thereon provided at one side with a cam-ring, a hub fast to the said shaft, and a clutch-lever pivoted to the said hub and provided with a projection adapted to engage a portion of the said cam-ring, combined with a controller device having a cam-surface, and a rock-shaft having arms, one of which is provided with a stud to engage the clutch-lever, the other arm being actuated by the said controller device to effect the release of the clutch at the proper time, and with a pawl to engage a notch of the said hub, to operate substantially as described.

In testimony whereof I have signed my name to this specification in the presence of two subscribing witnesses.

JOHN REECE.

Witnesses:
G. W. GREGORY,
F. L. EMERY.